US 8,168,241 B2
May 1, 2012

(12) United States Patent
Hastings et al.

(10) Patent No.: US 8,168,241 B2
(45) Date of Patent: May 1, 2012

(54) PERFORMANCE-ENHANCING DIETARY SUPPLEMENT

(75) Inventors: Carl W. Hastings, Glencoe, MO (US); David J. Barnes, Wildwood, MO (US); Christine A. Daley, Columbia, IL (US)

(73) Assignee: Reliv International, Inc., Chesterfield, MO (US)

( * ) Notice: Subject to any disclaimer, the term of this patent is extended or adjusted under 35 U.S.C. 154(b) by 2500 days.

(21) Appl. No.: 10/781,141

(22) Filed: Feb. 18, 2004

(65) Prior Publication Data
US 2004/0170709 A1 Sep. 2, 2004

Related U.S. Application Data

(63) Continuation of application No. 09/175,748, filed on Oct. 20, 1998, now abandoned.

(51) Int. Cl.
*A61K 36/48* (2006.01)
*A61K 31/385* (2006.01)

(52) U.S. Cl. ......... 424/757; 424/439; 514/440; 514/461

(58) Field of Classification Search ............... 424/757
See application file for complete search history.

(56) References Cited

U.S. PATENT DOCUMENTS

| | | | | |
|---|---|---|---|---|
| 3,894,148 A | * | 7/1975 | Ecker | 514/23 |
| 4,687,782 A | * | 8/1987 | Brantman | 514/561 |
| 4,832,971 A | | 5/1989 | Michnowski | 426/302 |
| 5,039,704 A | * | 8/1991 | Smith et al. | 514/563 |
| 5,438,042 A | | 8/1995 | Schmidl et al. | |
| 5,504,072 A | | 4/1996 | Schmidl et al. | |
| 5,536,506 A | * | 7/1996 | Majeed et al. | 424/464 |
| 5,756,469 A | | 5/1998 | Beale | |
| 5,817,329 A | * | 10/1998 | Gardiner | 424/439 |
| 5,856,149 A | * | 1/1999 | Pariza et al. | 435/134 |
| 5,944,012 A | | 8/1999 | Pera | |
| 5,948,810 A | * | 9/1999 | Wessel et al. | 514/440 |
| 5,976,568 A | * | 11/1999 | Riley | 424/451 |
| 6,136,339 A | * | 10/2000 | Gardiner | 424/439 |
| 6,139,339 A | | 10/2000 | Wu | |
| 6,224,871 B1 | * | 5/2001 | Hastings et al. | 424/195.17 |
| 6,893,627 B2 | * | 5/2005 | Ribnicky et al. | 424/725 |

FOREIGN PATENT DOCUMENTS

WO WO 97/13507 A1 * 4/1997

OTHER PUBLICATIONS

Naturally PhytoSource Nutrients Supplement-Super Vit-A-Boost 2000 Tablets; Phosphatidyl Ginkgo Boost Vegicaps Manufacturer: Naturally Vitamins Category:Vitamins & Tonics, Product Alert, (Nov. 25, 1996) vol. 26, No. 22. ISSN: 0740-3801.*

* cited by examiner

*Primary Examiner* — Jennifer M Kim
(74) *Attorney, Agent, or Firm* — Marshall, Gerstein & Borun LLP

(57) ABSTRACT

A dietary supplement for enhancing physical performance of human subjects is disclosed. The supplement in dry, finely-divided form includes as a major ingredient a soy protein isolate containing at least 80% protein on a moisture-free basis with lesser amounts of carbohydrate, free form amino acids, medium chain triglycerides, creatine monohydrate, l-carnitine, grape seed extract, coenzyme Q10, piper nigrum extract, and alpha lipoic acid. In a preferred embodiment, the supplement also includes minor amounts of conjugated linoleic acid and phosphatidylserine/phosphatidylcholine complex.

9 Claims, No Drawings

PERFORMANCE-ENHANCING DIETARY SUPPLEMENT

This application is a Continuation of U.S. application Ser. No. 09/175,748, filed Oct. 20, 1998, now abandoned.

BACKGROUND AND SUMMARY OF THE INVENTION

Soy protein is known to be the only plant protein equal in quality to protein derived from milk, meat or eggs. The most concentrated source of soy protein is soy protein isolate which, preferably, is manufactured by water extraction (rather than alcohol extraction) of defatted and dehulled soybeans and therefore retains its natural isoflavones. On a Protein Digestability Corrected Amino Acid Score (PDCAAS) of 1.0, soy protein isolate is highly digestible and meets or exceeds the essential amino acid requirements for children and adults. Such an isolate contains naturally high levels of branched chain amino acids to provide an energy source during physical activity, it having been reported that during the first 20 minutes of strenuous sports activity muscle glycogen serves as the primary energy source but that after 20 minutes bioavailable fatty acids and branched chain amino acids become the primary energy sources. Isolated soy protein is therefore known to be a highly desirable energy source for athletes that also helps to reduce muscle fatigue and enhance muscle recovery.

In addition, isolated soy protein is known to contain naturally high levels of arginine which stimulates the release of anabolic hormones to promote muscle formation, enhances wound healing, helps to maintain a strong and healthy immune system, and is believed to be beneficial in reducing stress. Such isolated soy protein is also a good source of naturally occurring iron, a fact of considerable importance for athletes who are highly susceptible to "sports anemia" resulting from loss of iron occurring in sweat and urine.

There is compelling evidence from both animal and human studies that, compared to animal protein, soy protein, soy protein also reduces elevated levels of LDL-cholestrol. A meta-analysis of 38 clinical studies reported in 29 scientific articles has provided quantitative data showing that consumption of soy protein rather than animal protein significantly decreases blood concentrations of total cholesterol, LDL-cholestrol, and triglycerides in humans. Anderson J. W., Johnstone B. M. and Cook-Newell M. E., NEJM 1995; 333: 276-282. Such studies provide motivation for recommending the increased consumption of soy protein, particularly isolated soy protein, as part of an integrated dietary approach to the control of hypercholesterolemia. It is therefore believed that the intake of protein isolates may be advantageous to athletes and others concerned about the risk of developing coronary heart disease.

The composition of this invention is a performance-enhancing dietary supplement that contains soy protein isolate in combination with free form amino acids and also other specified components, particularly medium chain triglycerides, with the latter coacting to improve the absorption by the body of the amino acids and calcium present in the soy protein isolate and the additional amino acids included in free form in the supplement. In addition, the medium chain triglycerides produce ketone bodies that burn preferentially to muscle tissue for energy, thereby reducing muscle loss. Such medium chain triglycerides provide over twice the energy of carbohydrates (they produce 8.3 calories per gram compared to 4 calories per gram for carbohydrates) and are absorbed as quickly as glucose without significant effect on insulin production.

Other constituents of the dietary supplement include creatine monohydrate which helps reduce muscle fatigue and rebuild lean muscle mass, l-carnitine which is a non-protein amino acid that acts as a biocatalyst to increase the use of fat for energy during exercise, coenzyme Q10 that, like l-carnitine, is important for its role in burning energy inside muscle cells at the mitochondria, grape seed extract and alpha lipoic acid, both of which are potent free radical scanvengers and chelators of toxic metals, and piper nigrum extract which increases the uptake of nutrients and their metabolic utilization. The supplement also preferably includes conjugated linoleic acid (CLA), a natural fatty acid that reduces body fat and increases muscle tone by helping the body extract more energy from less food, and a phosphtidylserine/phosphtidylcholine complex which functions as a cell membrane nutrient and a building block for the major membrane systems crucial to the survival and functioning of all cells. The supplement may also include one or more flavoring agents, such as vanilla extract, and processing agents such as lecithin which also lend solubility to the product.

The dietary supplement is provided as an essentially dry mixture in finely-divided (powdered) form with the recommended daily serving being about 26 g to about 78 g, depending on the level and intensity of physical activity involved. Individuals on an intense physical training regiment will gain optimal results at the higher levels of consumption whereas those on moderate or casual workout regimens will require less. A serving of at least 26 g per day is believed necessary to maintain optimal benefits. The powder is soluble in water and it is recommended that each daily serving be mixed with juice, water, milk, or any other drinkable non-alcoholic beverage.

DETAILED DESCRIPTION OF PREFERRED EMBODIMENT

A major ingredient of the dietary supplement of this invention is soy protein isolate containing at least 80% protein, preferably at least 90% protein, on a moisture-free basis. While alcohol extracted protein isolate may be used, it is preferred that the isolate be water extracted so that it retains its natural isoflavones. Isoflavones found naturally in soy are believed to inhibit the resorption of bone, it being noted that a synthetic isoflavone found effective in decreasing bone loss is similar in structure to soy bean isoflavones. Isolated soy protein suitable for use in the dietary supplement of this invention is commercially manufactured by water extraction of protein from defatted and dehulled soy beans and is heat treated during processing to insure inactivation of trypsin inhibitors. While isolated soy protein is commercially available from a number of sources, it is believed that a particularly effective soy protein isolate is marketed under the designation "Supro XT 12" by Protein Technologies International, St. Louis, Mo. Such isolate contains naturally high levels of branched chain amino acids as well as high levels of arginine, iron, and calcium. The essentially dry blend that constitutes the dietary supplement should contain about 55% to 70% by weight of such soy protein isolate.

Also included in the supplement is about 1% to 3% by weight of an amino acid premix composed of two or more free form amino acids selected from the group consisting of l-leucine, l-glutamine, l-alanine, glycine, l-arginine, l-lysine and ornithine alpha-ketogluterate. It is preferred that at least four of the free form amino acids be present in the supplement, namely, l-leucine, l-glutamine, l-alanine and glycine, and ideally all seven should be included. L-leucine is known to make up about one third of muscle protein and provides the ingredients for the manufacture of alanine and other essential biochemical components in the body, some of which are utilized for the production of energy. L-glutamine is known to promote anabolic conditions in muscle cells and increase the rate of protein synthesis. Glutamine indirectly promotes growth by increasing the hydration state of muscle cells. When cells are swollen with water, this inhibits the breakdown of protein, glycogen and glucose. Glutamine stimulates protein and glycogen synthesis. Conversely, if a cell becomes dehydrated, it shrinks and immediately goes into a catabolic state that breaks down the muscle's vital proteins.

L-alanine is an important source of energy for muscle tissue as well as for the brain and central nervous system. Additionally, it strengthens the immune system by producing antibodies and helps in the metabolism of sugars and organic acids. Glycine helps to trigger the release of oxygen to the energy-requiring cell-making process and is also known to be important in the manufacture of hormones responsible for a strong immune system.

It is known that l-arginine causes the release of growth hormones and is considered crucial for optimal muscle growth and tissue repair. It also promotes wound healing and regeneration of the liver, and studies have shown that it has improved immune responses to bacteria, viruses and tumor cells.

L-lysine is known to be important in insuring the adequate absorption of calcium. It also helps to form collagen and aids in the production of antibodies, hormones and enzymes. Ornithine alpha-ketoglutarate is an amino acid that improves performance in hypercatabolic states associated with such activities as vigorous sports and weightlifting. It has been noted that l-ornithine and alpha-ketoglutarate work synergistically in hypercatabolic states to achieve several favorable intermediate outcomes. Ornithine alpha-ketoglutarate reduces the rate at which ammonia accumulates. The nitrogen-sparing quality of ornithine alpha-ketoglutarate may be related to its ability to reduce the rate of glutamine loss, it being known that glutamine plays an important role in protein turnover during the catabolic states. As a result of these intermediate outcomes, ornithine alpha-ketoglutarate increases endurance, reduces muscle fatigue and shortens recovery time. In addition, it increases production of human growth hormone which in turn increases muscle mass.

Absorption by the body of the amino acids provided by this supplement both in free form and as branched chain amino acids in the soy protein isolate is enhanced by the inclusion of medium chain triglycerides which should be present in the amount of about 1.5% to about 2.5% by weight. Medium chain triglycerides (MCTs) are unique fatty acids that behave differently from all other fats and provide energy more like carbohydrates. They are also known as capric and caprylic fatty acids, and research studies published in medical and academic journals describe numerous benefits from the ingestion of MCTs. Of particular importance in the dietary supplement of this invention, MCTs improve the absorption of the amino acids that are critical for muscle tissue repair. They also improve the absorption of calcium, magnesium and other minerals needed for the metabolism of carbohydrates and amino acids and for improving muscle contraction response time. The MCTs therefore coact with the soy protein isolate and the free form amino acids, and with other ingredients of the supplement to improve the absorption of the amino acids. They also have a cholesterol lowering effect and are known to decrease the absorption of cholesterol in the intestine.

Further, MCTs decrease the absorption of oils, fats and cholesterol while reducing muscle tissue breakdown during dieting. It has been noted that MCTs provide about twice the energy of carbohydrates and avoid the false fatigue created by eating simple sugars because, while MCTs are absorbed as quickly as glucose, they have no significant effect on insulin production.

The dietary supplement should include about 20% to 30% by weight of a carbohydrate, particularly fructose. The fructose not only supplies an important energy source but also renders the supplement more palatable, masking other ingredients that despite their functional importance might otherwise produce a somewhat unfavorable taste sensation for some users. If desired, the supplement may also include suitable artificial and natural flavoring agents, such as a vanilla flavoring agent, but it is to be understood that the inclusion of such agents is optional and non-critical.

It is known that energy consumed by muscles is largely in the form of adenosine triphosphate (ATP) and that during short-term, high intensity exercise the demand by working muscles for ATP increases to several hundred times the requirement of muscles at rest. Since ATP can be stored only to a limited extent in muscle cells, maintaining peak performance requires constant replenishment of ATP levels. The primary resupplier of ATP levels for short-duration, high intensity exercise is the amino acid creatine, about 60% of which is stored in skeletal muscle tissue in the form of creatine phosphate. During muscle contraction, creatine phosphate converts adenosine diphosphate (ADP) to ATP, thereby replacing the ATP consumed during exercise. Muscle fatigue occurs when the supply of creatine phosphate is exhausted and ADP can no longer be converted to the necessary ATP.

Neither creatine phosphate nor ATP can be directly supplemented in the diet; however, higher levels of creatine may be derived from creatine monohydrate, a form of creatine which has been shown to raise total plasma levels of creatine. Creatine monohydrate is therefore included in the dietary supplement of this invention to shorten the time necessary for the body to generate replacement creatine phosphate and thus significantly reduce muscle recovery time between short duration, high intensity activities. The weight percent of such creatine monohydrate in the dietary supplement should fall within the range of about 1.5% to 2.5%.

Recent studies have shown that athletes who supplement their diet with l-carnitine convert fat to energy more efficiently. L-carnitine is a non-protein amino acid that functions primarily in the body as a biocatalyst. Fats are burned for energy inside muscle cells at the mitochondria, but such fats are stored in adipose cells and cannot pass through the mitochondria unless they are transported by l-carnitine. Thus, the amount of fat burned depends on the level of l-carnitine in the muscle, and recent studies have indicated that athletes supplementing their diet with l-carnitine significantly increase the use of fat for energy during exercise. This dietary supplement includes l-carnitine to the extent of about 0.18% to 0.28% by weight to increase the burning of fat for energy during exercise as well as to inhibit the buildup of lactic acid in muscle, reduce muscle fatigue, decrease ketone levels in blood, and help to increase high density lipoproteins (HDL) while lowering low density lipoproteins (LDL) in the blood.

The dietary supplement disclosed herein also includes about 0.025% to 0.035% by weight coenzyme Q10 and about 0.01% to 0.02% by weight piper nigrum extract, the latter being commercially available under the designation "Bioperine" from Sabinsa Corporation, Piscathaway, N.J. Coenzyme Q10, first isolated from the heart muscle of cattle approximately 40 years ago, has been found to be an important component in the energy production process in cell mitochondria and more recently has been used clinically to improve the condition of patients with congestive heart failure. Through double blind studies, it has been demonstrated that the bioavailability of coenzyme Q10 is significantly increased by the co-administration of piper nigrum extract. As noted in Majeed et al U.S. Pat. No. 5,536,506, the disclosure of which is incorporated herein by reference, the metabolic pathways for a nutrient and a drug are different in that a nutrient sustains basic metabolism and physiological functions of an organism while a drug is utilized as an adjunct to basic metabolism to restore homeostasis to the physiological functions. In the context of this invention, piper nigrum extract is considered to increase the absorption of nutrients and to increase their metabolic utilization. Its inclusion in this nutritional supplement is intended to enhance the crossing-over of nutrients and botanical compounds through biological barriers such as, but not limited to, the gastrointestinal epithelium.

The dietary supplement also includes metabolic antioxidants in the form of grape seed extract (0.15% to 0.25% by weight) and alpha lipoic acid (0.0001% to 0.0003% by weight). Studies have shown that the biologically active flavonoids that are concentrated inside red grape seeds contain some of the most powerful antioxidants yet discovered. A particularly effective grape seed extract is commercially available under the designation "ActiVin" from Interhealth Nutritionals Inc., Concord, Calif.; the antioxidant activity of that extract has been shown to be significantly greater than that of vitamins E, C, and beta-carotene, all of which are known to be powerful antioxidants that help the body fight free radicals that have been implicated in a multitude of serious health conditions. In addition, the biologically active flavonoids of the grape seed extract appear useful in helping to maintain normal blood platelet function and reduce blood platelet stickiness, thereby helping to maintain proper cardiovascular health.

Alpha lipoic acid is a coenzyme that participates in converting blood sugar (glucose) into energy and, in addition, is an antioxidant nutrient that networks with other antioxidants, including grape seed extract and vitamins C, E, and A, in quenching free radicals. It is understood that the other antioxidant nutrients function more effectively when there is more lipoic acid available than what is tied up in use by the body as a coenzyme. Lipoic acid is easily absorbed and is readily bioavailable.

In a preferred embodiment of the invention, the dietary supplement also includes conjugated linoleic acid (about 00.5% to 1.5% by weight) and a phosphatidylserine/phosphatidylcholine complex (about 0.25% to 0.35% by weight). Conjugated linoleic acid (CLA) is an essential fatty acid that reduces body fat and increases muscle tone by helping the body extract more energy from less food. While CLA is believed to be commercially available from a number of sources, one commercial product is marketed under the designation "Tonalin" by PharmaNutrients, Inc., Norway. Studies with CLA have revealed as much as a 20% reduction in body fat resulting from the ingestion of CLA, and other studies have shown that it acts as an active anti-carcinogen.

Phosphatidylserine/phosphatidylcholine has been referred to as a "complex" but that term is used broadly in this context to include mixtures as well as interrelated chemical structures. Phosphatidylserine is a natural soy-derived phospholipid that is known to be effective in suppressing cortisol levels. Cortisol, at the cellular level, plays an important regulatory function metabolism of protein, fat, carbohydrate, sodium and potassium. However, cortisol is also a catabolic stress hormone that rises in response to exercise and may interfere with training and athletic performance by causing breakdown of muscle tissue. Therefore, phosphatidylserine may be useful to bodybuilders, powerlifters, runners, cyclists, rollers, swimmers and other high performance athletes to increase the rate of protein (muscle) synthesis during periods normally marked by muscle breakdown and to protect against the loss of amino acids, glucose, potassium and, potentially, creatine from muscle cells. It is believed to enhance the uptake of vital nutrients into muscle tissue during and after training and to accelerate muscle recovery following training.

Phosphatidylcholine is a cell membrane nutrient and a building block for the major membrane systems crucial to the survival and functioning of all cells. It has long been known as a nutritional supplement, but it has now been recognized for its effective benefits for liver function. In addition, when used in a nutritional supplement, it helps to replenish blood choline levels.

The dietary supplement optionally includes flavoring agents (0% to 3%) and a processing agent such as lecithin (0% to 3%). In the context of this invention, lecithin is considered useful primarily as a blending agent that also improves the solubility of the dietary supplement as a whole. It is commonly used in foods as an emulsifier, release agent, and instantizing agent. However, to the extent that lecithin is a complex mixture of phospholipids such as phosphatidylcholine and other substances, it is also believed to be a nutritional supplement.

The following examples are not intended to be limiting in any way, but demonstrate some of the preferred embodiments of the present invention.

Example 1

A soy-based performance-enhancing dietary supplement of this invention contains the following ingredients in the percentages indicated: soy protein isolate (Supro XT12) about 61.9%, fructose 27.7%, amino acid premix (consisting of l-leucine l-glutamine, l-alanine, glycine, l-arginine, l-lysine and orinthine alpha-ketoglutarate) 2.7%, CLA (Tonalin) 0.1%, phosphatatidylserine/phosphatidylcholine complex (Corti PS 20) 0.3%, medium chain triglyceride (MCT) powder 1.9%, creatine monohydrate 1.9%, l-carnitine 0.2%, grape seed extract (ActiVin) 0.2%, coenzyme Q10 0.03%, piper nigrum extract (Bioperine) 0.01%, alpha lipoic acid 0.0002%. The supplement also includes lecithin, primarily as a blending agent, 1.3%, and flavoring agents (BBA Vanilla 14199) 1.7%.

Using a conventional plow blender set for continuous mixing, the fructose is first introduced into the mixing chamber with the blender in operation, and the lecithin and CLA (Tonalin) are added gradually. The choppers are then turned on for approximately 2 minutes, followed by the addition of other dry ingredients in the following sequence: Supro XT 12, amino acid premix, Corti PS 20, creatine monohydrate, MCT powder, Bioperine, ActiVin, alpha lipoic acid, coenzye Q10, l-carnitine, and flavoring agents. The choppers are again turned on for a period of an additional 2 minutes to produce a uniformly-mixed dietary supplement embodying the invention.

The dietary supplement prepared in accordance with this example takes the form of a fine powder to be consumed eternally as a beverage. One to three scoops (26 g to 78 g) of the powder are mixed with water, juice, milk or any other suitable beverage, and the recommend serving consumed once each day.

Example 2

A dietary supplement may be prepared in accordance with Example 1 in which the amino acid premix is composed of the following ingredients and percentages (per total premix): l-glutamine 22.2%, l-arginine 22.2%, l-leucine 27.8%, l-lysine 11.1%, l-alanine 5.6%, glycine 5.6%, l-ornithine alpha-ketoglutarate 5.5%.

Example 3

A dietary supplement may be prepared in accordance with Example 1 in which acid premix is 1.63% by weight and consists of four amino acids in the following percentages (per total premix): l-leucine 45.4%, l-glutamine 36.4%, l-alamine 9.1%, glycine 9.1%.

While in the foregoing we have disclosed embodiments of the invention in considerable detail for purposes of illustration, it will be understood by those skilled in the art that many of these details may be varied without departing from the spirit and scope of the invention.

The invention claimed is:

1. A food supplement, comprising a dry mixture of the following ingredients in a daily serving of about 26 g to 78 g: 55% to 70% water extracted soy protein isolate containing at least 80% protein; 20% to 30% carbohydrate consisting essentially of fructose; 1% to 3% of an amino acid premix comprising two or more free form amino acids selected from the group consisting of l-leucine, l-glutamine, l-alanine, glycine, l-arginine, l-lysine and ornithine alpha-ketoglutarate; 1.5% to 2.5% medium chain triglycerides; 1.5% to 2.5% creatine monohydrate; 0.25% to 0.35% phosphatidylserine/phosphatidylcholine complex; 0.18% to 0.28% l-carnitine; 0.15% to 0.25% grape seed extract; 0.025% to 0.035% coenzyme Q10; 0.01% to 0.02% piper nigrum extract; and 0.0001% to 0.0003% alpha lipoic acid.

2. The food supplement of claim 1 in which said amino acid premix includes the following amino acids: l-leucine, l-glutamine, l-alanine and glycine.

3. The food supplement of claim 2 in which said amino acids are present in the following percentages per total weight of premix: l-leucine 35% to 45%, l-glutamine 30% to 40%, l-alanine 5% to 15%, glycine 5% to 15%.

4. The food supplement of claim 1 in which said mixture also includes 0.05% to 0.15% conjugated linoleic acid.

5. The food supplement of claim 1, 2 or 4 in which said soy protein isolate includes retained isoflavones.

6. The food supplement of claim 1 in which said amino acid premix includes l-leucine, l-glutamine, l-alanine, glycine, l-arginine, l-lysine and ornithine alpha-ketoglutarate.

7. The food supplement of claim 6 in which said amino acids are present in the following percentages per total weight of premix: l-leucine 25% to 30%, l-glutamine 20% to 25%, l-alanine 4% to 7%, glycine 4% to 7%, l-arginine 20% to 25%, l-lysine 8% to 15%, ornithine alpha-ketoglutarate 4% to 7%.

8. The food supplement of claim 1 in which said mixture also includes 0% to 3% lecithin and 0% to 3% one or more flavoring agents.

9. A food supplement comprising a dry mixture of the following ingredients in a daily serving of about 26 g to 78 g: about 61.9% water-extracted soy protein isolate containing at least 80% protein, about 27.7% carbohydrate consisting essentially of fructose, about 2.7% of an amino acid premix comprising two or more free form amino acids selected from the group consisting of l-leucine, l-glutamine, l-alanine, glycine, l-arginine, l-lysine and ornithine alpha-ketoglutarate; about 1.9% medium chain triglycerides, about 1.9% creatine monohydrate; about 0.2% l-carnitine; about 0.2% grape seed extract, about 0.1% conjugated linoleic acid, about 0.3% phosphatidylserine/phosphatidylcholine complex, about 0.03% coenzyme Q10, about 0.01% piper nigrum extract, about 0.0002% alpha lipoic acid, about 1.3% lecithin, and about 1.7% flavoring agents.

* * * * *

UNITED STATES PATENT AND TRADEMARK OFFICE
CERTIFICATE OF CORRECTION

| | | |
|---|---|---|
| PATENT NO. | : 8,168,241 B2 | Page 1 of 1 |
| APPLICATION NO. | : 10/781141 | |
| DATED | : May 1, 2012 | |
| INVENTOR(S) | : Hastings et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2384 days.

Signed and Sealed this
Twenty-sixth Day of June, 2012

David J. Kappos
*Director of the United States Patent and Trademark Office*

UNITED STATES PATENT AND TRADEMARK OFFICE
CERTIFICATE OF CORRECTION

PATENT NO.        : 8,168,241 B2  
APPLICATION NO.   : 10/781141  
DATED             : May 1, 2012  
INVENTOR(S)       : Hastings et al.

Page 1 of 1

It is certified that error appears in the above-identified patent and that said Letters Patent is hereby corrected as shown below:

In the Claims

In Column 7, Line 37, in Claim 1, delete "1-carnitine;" and insert -- l-carnitine; --, therefor.

In Column 8, Line 33, in Claim 9, delete "1-carnitine;" and insert -- l-carnitine; --, therefor.

Signed and Sealed this  
Sixteenth Day of February, 2016

Michelle K. Lee  
*Director of the United States Patent and Trademark Office*